United States Patent [19]

Weber et al.

[11] 4,412,232

[45] Oct. 25, 1983

[54] INK JET PRINTER

[75] Inventors: Helmut Weber, Augsburg; Peter H. Reitberger, Munich; Leonhard Bader; Walter König, both of Augsburg, all of Fed. Rep. of Germany

[73] Assignee: NCR Corporation, Dayton, Ohio

[21] Appl. No.: 368,611

[22] Filed: Apr. 15, 1982

[51] Int. Cl.[3] .......... G01D 15/18

[52] U.S. Cl. .......... 346/140 R

[58] Field of Search .......... 346/1.1, 75, 140

[56] References Cited

U.S. PATENT DOCUMENTS

| | | | |
|---|---|---|---|
| 2,066,880 | 1/1937 | Eissfeldt | 346/140 X |
| 3,102,770 | 9/1963 | McKeegan | 346/140 R |
| 3,950,762 | 4/1976 | Anderka | 346/140 R |
| 4,042,937 | 8/1977 | Perry et al. | 346/1.1 |
| 4,293,865 | 10/1981 | Jinnai et al. | 346/140 PD |
| 4,325,072 | 4/1982 | Rösel | 346/140 R |

FOREIGN PATENT DOCUMENTS

| | | | |
|---|---|---|---|
| 2063175A | 6/1981 | United Kingdom | 346/140 R |

*Primary Examiner*—Donald A. Griffin

*Attorney, Agent, or Firm*—J. T. Cavender; Stephen F. Jewett

[57] ABSTRACT

An ink jet printer includes a print head having a plurality of piezoelectric driving elements selectively energizable to cause ejection of droplets of ink through nozzles in a nozzle plate. Ink is supplied to the print head from an ink reservoir which is connected to a bellows device. The ink reservoir and the bellows device together form an air-tight container. The bellows device has a resilient form of construction so as to tend to increase the volume of the container. As a result, an appropriate underpressure is maintained in respect of the ink in the nozzles, such underpressure being necessary to prevent ink escaping from the nozzles under quiescent conditions. In operation, the bellows device progressively collapses so as to reduce the rate at which the underpressure increases as ink is ejected, thereby prolonging the period for which the underpressure is maintained within a desired operating range. In two other embodiments, the reservoir is enclosed by a piston or a membrane, both biased against collapse by a compression spring. In yet another embodiment, underpressure within the reservoir is maintained by a capillary tube that at one end is immersed in ink and at the other end is open to the exterior of the printer.

10 Claims, 14 Drawing Figures

INK JET PRINTER

BACKGROUND OF THE INVENTION

The present invention relates to ink jet printers, and, more particularly, to ink jet printers which utilize the so-called drop-on-demand method of operation.

Non-impact printers have recently become very popular due to their quiet operation resulting from the absence of mechanical printing elements impacting on record media during printing. Among such printers, ink jet printers are particularly important as they permit high speed recording on plain untreated paper.

Various ink jet printing methods have been developed over the past years. In the so-called continuous ink jet method, such as disclosed in U.S. Pat. No. 3,596,275, the ink is delivered under pressure to nozzles in a print head to produce a continuous jet of ink emitted through each nozzle. The ink jet is separated by vibration into a stream of droplets which are charged, and the flying droplets are either allowed to impact on a record medium or are electrostatically deflected for collection in a gutter for subsequent recirculation.

A second method, known as the electrostatic method, is disclosed, for example, in U.S. Pat. No. 3,060,429. In this method the ink in the nozzles is under zero pressure or low positive pressure, and the droplets are generated by electrostatic pull and caused to fly between two pairs of deflecting electrodes arranged to control the direction of flight of the droplets and their deposition in desired positions on the record medium.

A third method, which is known as the drop-on-demand method, is described, for example, in U.S. Pat. No. 4,125,845. The droplets in this method are emitted under the control of an electronic character generator by means of volume displacement brought about in an ink chamber or channel by means of energization of a piezoelectric element. The volume displacement generates a pressure wave which propagates to the nozzles causing the ejection of ink droplets.

The drop-on-demand method has several advantages over the other above-mentioned methods. Ink jet printers using this method have a simpler structure requiring neither deflecting means for controlling the flight of the droplets nor the provision of an ink recovery system. Multiple-nozzle print heads using this method are simple and compact and are relatively easy to manufacture.

The drop-on-demand method requires that under quiescent conditions there is an appropriate underpressure, i.e. negative pressure, in the ink chamber or reservoir, in order to retain the ink in the nozzle until such time that it is to be ejected. The amount of the underpressure is critical. With too small an underpressure, or with a positive pressure, ink tends to escape through the nozzles. On the other hand, with too high an underpressure, air may be sucked in through the nozzles under quiescent conditions. The required underpressure may be obtained gravitationally by lowering the ink reservoir so that the ink surface level therein is below the level of the nozzles. However, such positioning of the ink reservoir may not always be easily achieved, as it may require complex changes in the design of the ink jet printer or its print head. Moreover, it cannot be achieved in hand-held ink jet printers which must be capable of being tilted to print on a variety of objects such as parcels, packets, envelopes, sheets, or the like.

The above-mentioned U.S. Pat. No. 4,125,845 describes a pressure regulating system which maintains the pressure within predetermined limits by means of a piezoelectrically driven valve and a wire gauge pressure sensor and electronic control. This arrangement is complicated, costly and tends to malfunction because of its complexity. Also, it is disadvantageous to use electromechanically operated elements, such as valves, in a non-impact printer, since this will tend to reduce life expectancy as a result of wear of such elements.

SUMMARY OF THE INVENTION

According to the invention, there is provided an ink jet printer including a print head having at least one piezoelectric actuating or driving element selectively energizable to cause ejection of a droplet of ink through a nozzle associated therewith, and an ink reservoir for supplying ink to said print head, said ink reservoir at least partly constituting a container which is air-tight in operation of the printer to permit an underpressure within the reservoir and in respect of the ink in the nozzle. The printer includes means, in the form of a collapsible chamber or bellows device, that decreases the volume of the container as ink is ejected, thereby preventing excessive underpressure build-up within the reservoir. The bellows device also provides resilient means for tending to increase the volume of said container, i.e., resisting or biasing against the decrease in container volume, so as to create and maintain the desired underpressure within the reservoir.

According to another aspect of the invention, there is provided an ink jet printer including a print head having at least one piezoelectric driving element selectively energizable to cause ejection of a droplet of ink through a nozzle associated therewith, an ink reservoir for supplying ink to said print head, and capillary means connecting the interior of the ink reservoir with the ambient atmosphere, with one end of said capillary means being so arranged as to be immersed in operation in ink contained in the reservoir, the reservoir being air-tight in operation apart from the provision of said capillary means whereby an underpressure is maintained in respect of the ink in said nozzle, any increase in underpressure as ink droplets are ejected being inhibited by virtue of the intake of air into the reservoir via said capillary means.

The present invention finds particular use in hand-held ink jet printers for which the drop-on-demand method is particularly well suited by virtue of its simplicity and low energy consumption and by virtue of the fact that it makes possible the construction of a self-contained and compact unit.

It is, therefore, an object of the present invention to provide an improved ink jet printer.

It is a further object of the present invention to provide an improved hand-held ink jet printer, wherein ink is ejected according to the drop-on-demand method.

It is yet a further object of the present invention to provide an ink jet printer of the drop-on-demand type, wherein the required underpressure in the ink supply is obtained automatically.

These and other objects will become more apparent when taken in conjunction with the following description and the attached drawings.

DETAILED DESCRIPTION OF THE INVENTION

Figure 1:
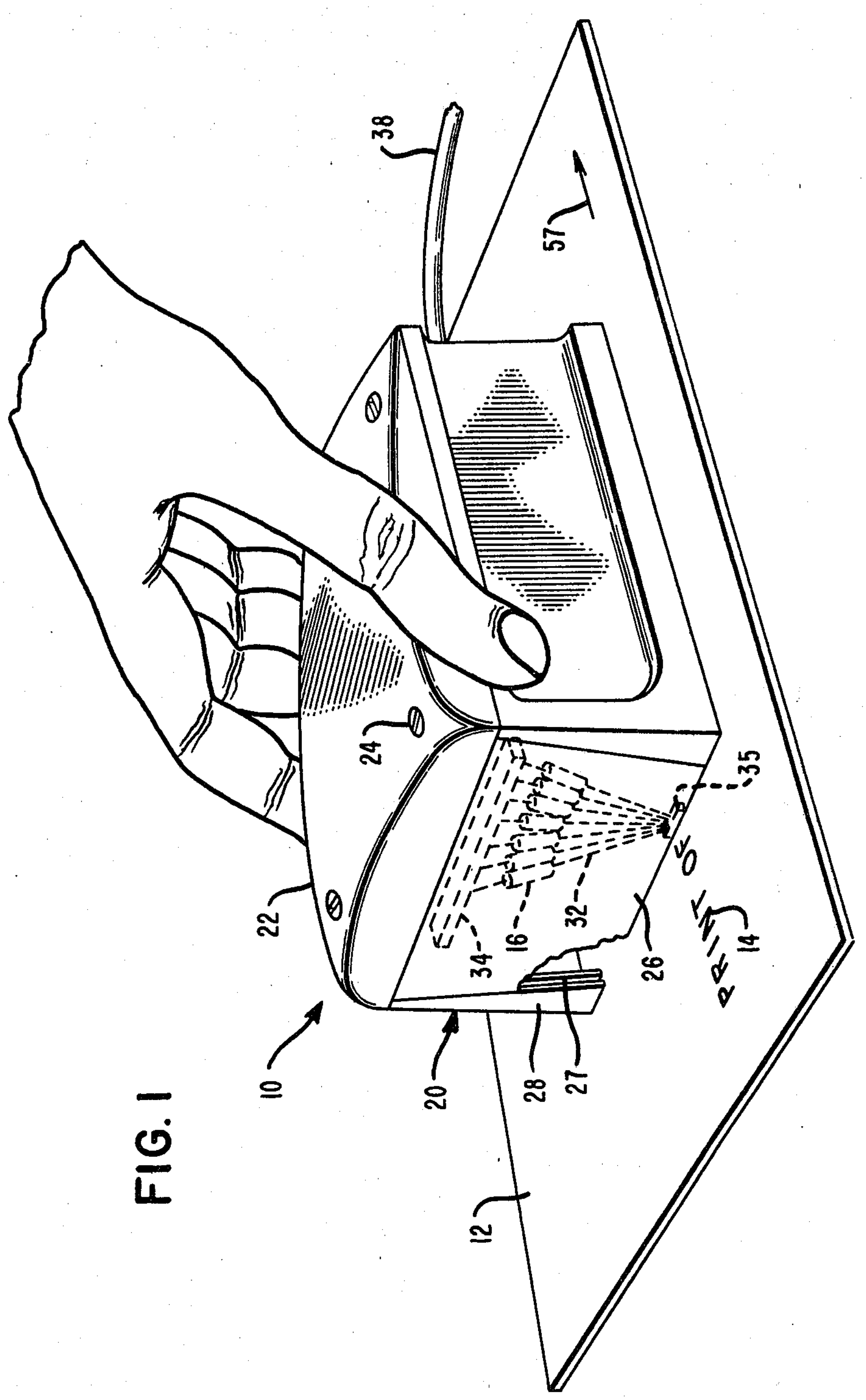
FIG. 1 is a perspective view of a hand-held ink jet printer according to the invention, incorporating a multiple-nozzle ink jet print head.

Referring to FIGS. 1 to 4, there is shown therein a hand-held ink jet printer 10 which is arranged to be moved by hand along a record medium 12 (FIG. 1) to print alpha-numerical characters 14 thereon by selective actuation or energization of piezoelectric crystal drive elements 16 of a print head 17, the elements 16 being arranged to bring about ejection of droplets of ink through respective nozzles 18 (FIG. 4) associated therewith. The energization of the piezoelectric elements 16 is controlled in a well-known conventional manner, and will be briefly described later with reference to FIG. 5.

The printer 10 has a housing 20 of synthetic material (such as plastic) for housing the operating elements of the printer, a cover 22 being attached to the housing 20 by a plurality of screws 24. An end wall of the housing 20 is formed by a plate member 26 slidably inserted into grooves 27 (FIG. 1) along end wall portions 28 of the housing 20. The cover 22 and the plate member 26 may be removed from the housing 20 to allow access to the operating elements.

The operating elements of the print head 17 are embedded or potted in a block 30 of plastic material which is press-fitted into the housing 20 behind the plate member 26, and held tightly in place by the cover 22 and a member 31 (FIG. 3) protruding from the inside of the housing 20. The plate member 26 is preferably of transparent material to allow for inspection of the print head 17. The print head 17 includes a plurality of ink channels 32, each extending from a common intermediate container or ink supply manifold 34 to the corresponding nozzle 18 formed in a nozzle plate 35 embedded in the block 30. A typical number of nozzles 18 for good legibility of prints produced in a dot matrix manner is between seven and twelve; in the present embodiment the number of nozzles in the print head 17 is seven. The nozzles 18 are arranged in a straight line extending transversely to the direction of print head movement and parallel to the plane of the record medium 12 on which printing takes place. Each of the piezoelectric drive elements 16 surrounds a segment of its respective ink channel 32. The elements 16 have energizing leads 36 which are connected to an electrical supply cable 38 via a connector 39 (FIG. 2).

Figure 2:
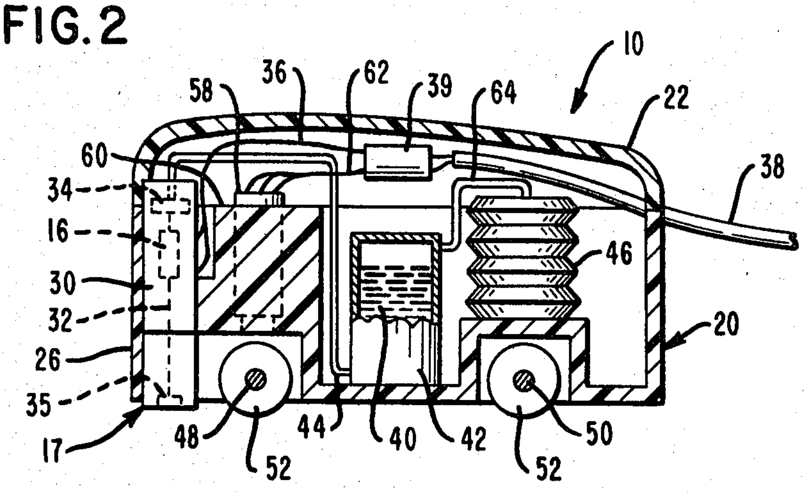
FIG. 2 is a sectional side elevation of the printer of FIG. 1, the section being taken along the line 2—2 of FIG. 3.

As shown in FIG. 2, ink 40 is supplied to the manifold 34 from an ink reservoir 42 which is in fluid connection with the ink supply manifold 34 through an ink supply tube 44. A pressure regulating bellows device 46 is connected with the ink reservoir 42 for reasons explained later.

Figure 3:
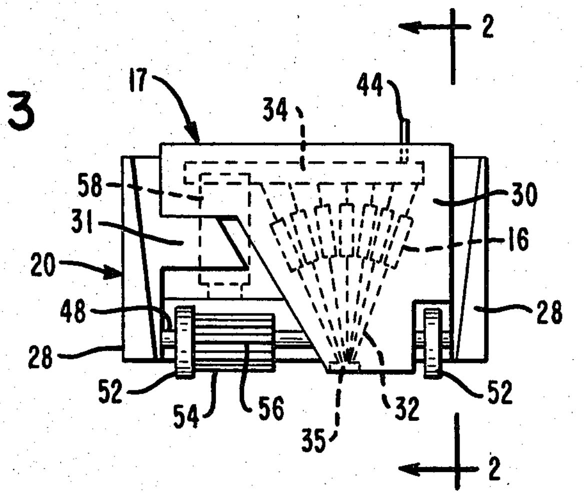
FIG. 3 is a front elevation of the printer of FIG. 1, with the front wall and cover removed to show the print head, wheels and timing means.

Two shafts 48, 50 extend between and are rotatably supported on the side walls of the housing 20, each shaft 48, 50 having a pair of rubber coated wheels 52 mounted thereon adjacent its ends. The wheels 52 permit linear rolling movement of the printer 10 over the record medium 12, and also serve to provide the desired spacing between the nozzle plate 35 and the adjacent surface of the record medium 12. As shown in FIG. 3, a cylindrical member 54 is mounted on the shaft 48 for rotation with the wheels 52, the circumference of the cylindrical member 54 being provided with a plurality of equally spaced grooves or lines 56; the member 54 acts as a timing wheel, as will be explained hereafter. A clutch (not shown) may be mounted on one of the shafts 48, 50 to permit movement of the printer 10 in one direction only, such as the direction of arrow 57 in FIG. 1.

An optical sensing device 58, which includes a light emitting diode (LED) and a phototransistor, is mounted in, and extends through, a block 60 integrally formed with the housing 20, the sensing device 58 being disposed in operative relationship with the grooved cylindrical member 54. Optical encoder model HETS 1000 manufactured by Hewlett-Packard may be utilized as the device 58. Electrical leads 62 for the sensing device 58 are connected to the cable 38 via the connector 39. For clarity, the leads 62 and the leads 36 for the piezoelectric elements 16 are omitted from FIG. 3.

In operation of the printer 10, the optical sensing device 58 sequentially senses the grooves or lines 56 of the rotating cylindrical member 54 as the printer 10 is pushed along the record medium 12, the sensing device 58 producing an electrical pulse each time it senses a groove or line 56. As will be described later with reference to FIG. 5, the pulses produced by the sensing means 58 are utilized in known manner to synchronize energization of the piezoelectric elements 16. The width of each groove or line 56 is typically 0.3 millimeter and is so chosen that the distance between the sensed leading and trailing edges thereof represents a dot location in each character 14 to be printed.

As seen in FIG. 2, the interior of bellows device 46, which is of rubber or other suitable elastic material, is in fluid communication or connection with the top of the ink reservoir 42, above the level of ink 40 therein, by means of a connection tube 64. Since the ink 40 may be of a type that reacts chemically with the rubber or other material of which the bellows device 46 is made, the ink is prevented from making contact with the bellows device 46. In order to achieve this, gas, such as air or nitrogen, is maintained in the bellows device 46, in the connection tube 64 and in the reservoir 42 above the ink level. The tube 64 has a small diameter since it is required for gas pressure equalization only, and the inner surface thereof is coated, at least in part, with a material which is not wetted by the ink 40 so as to prevent ink from penetrating into the connection tube 64. Silicon oil has been found to be a suitable coating material for use with water-based inks.

Figure 4:
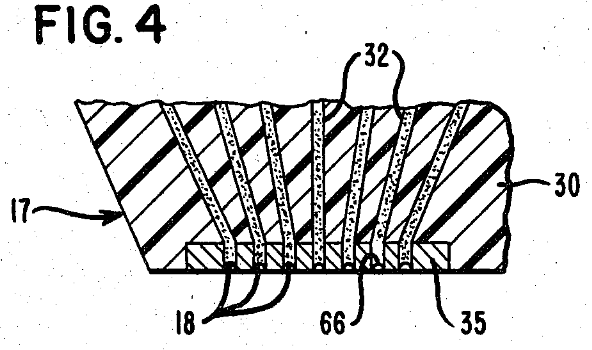
FIG. 4 is an enlarged sectional view of a portion of the print head as shown in FIG. 3.

In operation (with ink present in the reservoir), the bellows device 46, the tube 64 and ink reservoir 42 together form an air-tight container. The bellows device 46 has a resilient form of construction such that the device 46 tends to expand the volume of the air-tight container thereby creating the required underpressure in respect of the ink in the nozzles 18; this underpressure causes the ink in each nozzle 18 to form a concave meniscus 66 as seen in FIG. 4. Moreover, the form of construction of the bellows device 46 permits a progressive collapse of the device 46 as ink droplets are ejected from the nozzles 18 in operation, thereby permitting a pregressive decrease in the volume of the air-tight container so as to reduce the rate at which the underpressure increases as ink is ejected. The resiliency of the side walls of the bellows device, of course, resist or bias against the collapse in order to maintain the desired minimum underpressure. Thus, the underpressure remains within the useful operating range for a considerable time allowing for full use of the ink 40 in the reservoir 42 before replacement of the reservoir by a new ink-filled reservoir becomes necessary.

In the embodiment described, the reservoir 42 can have a height of 2.5 centimeters and a diameter of 1 centimeter. The bellows device 46 can be a commercially available device, such as Article No. 14405/08, sold by Karl Freudenberg Company of Weinheim, Germany. The nozzles 18 each have a diameter of 0.07 millimeters. With nozzles of this diameter, the preferred useful operating range of the underpressure is found to be between about 2 and 5 centimeters of water below atmospheric pressure. However, the printer 10 may operate satisfactorily provided the underpressure lies within the range of 1 to 10 centimeters of water below atmospheric pressure. Other ranges are possible, of course, depending upon the diameter of the nozzles and the type of ink used.

Figure 5:
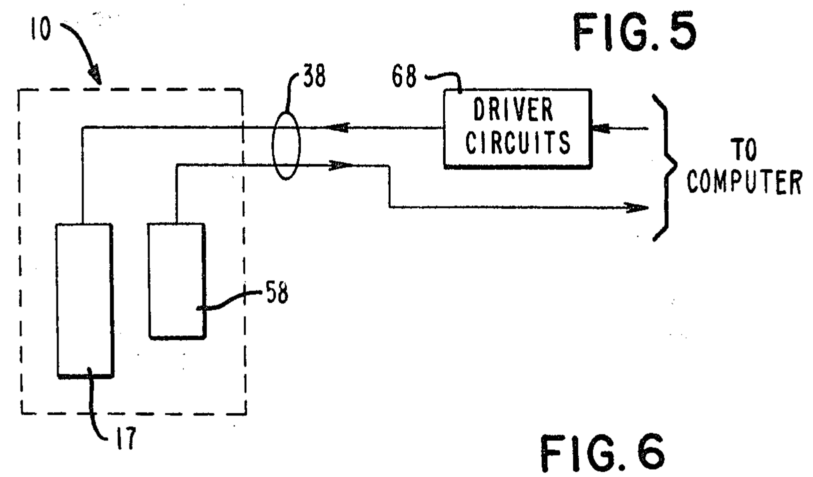
FIG. 5 is a simplified block diagram showing means for controlling the operation of the printer of FIG. 1.

As shown schematically in FIG. 5, the print head 17 and sensing device 58 are connected via cable 38 and conventional driver circuits 68 to a computer or data processing equipment and associated printer control, that provide data and character signals in response to the timing signals from sensing device 58, in order to control the driver circuits 68 to print the desired characters 14. The use of a movement sensing device, such as device 58, in conjunction with a computer to control a hand-held ink jet printer is known in the art. For example, reference can be had to U.S. Pat. No. 3,656,169, issued to T. Kashio. Briefly, however, the timing pulses generated by device 58 are delivered to the computer, indicating the movement of the printer 10. In response to the timing pulses, the computer and conventional character generating circuitry can control the driver circuits to selectively energize the piezoelectric elements 16. Since the energization of the piezoelectric elements 16 is brought about in response to a timing pulse generated by the sensing device 58, a uniform print will always be produced, at whatever speed the printer is moved over the record medium 12. During the printing of a character 14 (FIG. 1) on the record medium 12, each of the columns of dot positions making up the character is printed by energization of a selected one, or selected ones, of the piezoelectric elements 16.

Figure 6:
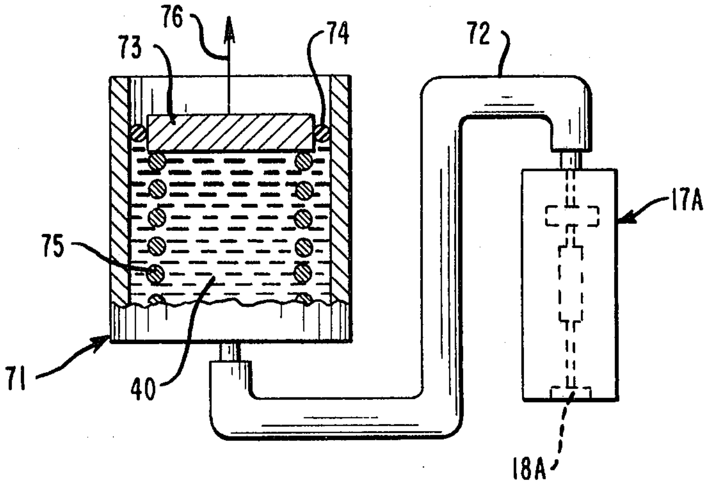
FIG. 6 is a schematic representation of an alternative pressure regulating system for producing the required underpressure in respect of the ink in the nozzles of the printer of FIG. 1.

Referring to FIG. 6, there is shown an alternataive pressure regulating system in accordance with the present invention that incorporates an ink reservoir 71 connected by a tube 72 to a print head 17A. The print head 17A is identical with the print head 17 of the printer 10 shown in FIGS. 1 to 4. The reservoir 71 is closed at its top by an axially movable piston member 73 carrying a piston ring 74 around its circumference in order to prevent air from penetrating into the reservoir 71. Thus, in operation, with ink 40 present in the reservoir 71, the reservoir 71 constitutes an air-tight container. A helical compression spring 75 is arranged within the reservoir 71 to exert an upward pressure on the piston member 73 tending to move it in the direction of the arrow 76. It will be appreciated that the helical spring 75 tends to expand the volume of the ink reservoir 71 thereby producing the required underpressure in respect of the ink in the nozzles 18A of the print head 17A. Moreover, as ink droplets are ejected from the print head 17A, the spring 75 is progressively compressed, thereby permitting a progressive decrease in the volume of the reservoir 71 so as to decrease the rate at which the underpressure is increased as ink is ejected. It should be understood that the reservoir 71 and associated spring-biased piston 73 may be used in place of the combination of the reservoir 42 and bellows 46 of the ink jet printer 10 of FIGS. 1 to 4.

Figure 7:
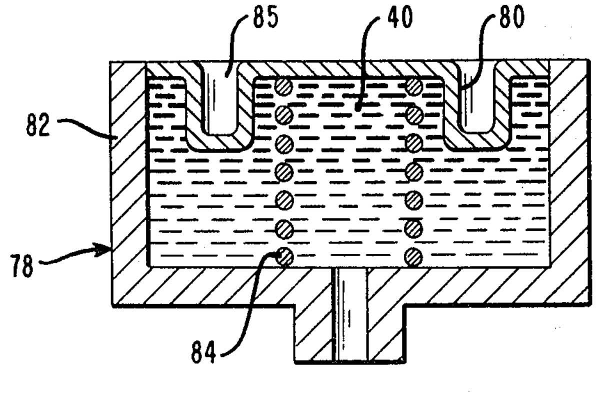
FIG. 7 is a schematic representation of a modified version of the ink reservoir shown in FIG. 6.

Referring to FIG. 7, there is shown therein a reservoir 78 containing ink 40. The reservoir 78 is a modified version of the reservoir 71 of FIG. 6. Instead of a piston member, the reservoir 78 incorporates a foil or membrane 80 of flexible material secured to a rigid wall portion 82 of the reservoir 78 so that the filled reservoir is air-tight. A compression spring 84 exerts pressure on the flexible membrane 80 thereby tending to expand the volume of the ink reservoir 78 so as to produce the required underpressure in respect of ink in the nozzles of a print head (not shown) connected to the reservoir 78. The spring 84 is progressively compressed as ink is ejected from the printhead, so as to reduce the rate of increase in underpressure. Excess foil is provided at an annular groove or fold 85 in membrane 80, to provide enough slack so that membrane 80 does not break or tear as the membrane follows the compression of spring 84. The reservoir 78 of FIG. 7 has the advantage that no friction is generated during contraction of the volume of the reservoir.

Figure 8:
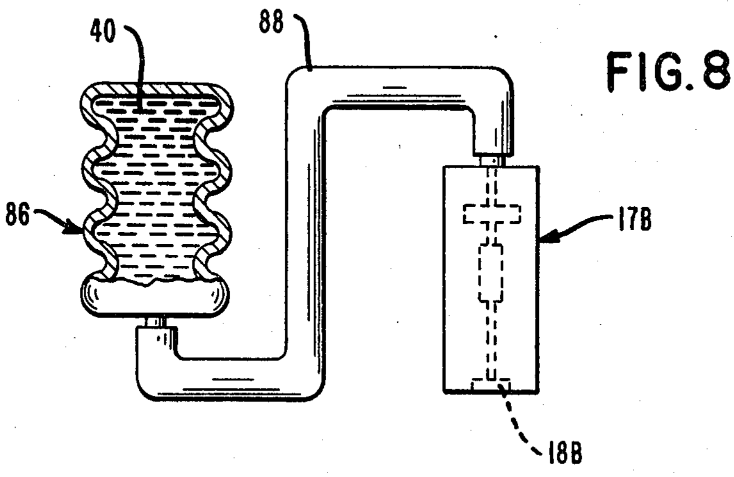
FIG. 8 is a schematic representation of another pressure regulating system in accordance with the invention.

Referring to FIG. 8, the pressure regulating system shown therein includes an ink reservoir 86 containing ink 40 connected via a tube 88 to a print head 17B which is identical with the print head 17 of the priner shown in FIGS. 1 to 4. In this embodiment, the ink reservoir 86 itself consitutes resilient means for bringing about the required underpressure in respect of the ink in the nozzles 18B of the print head 17B. Thus, the ink reservoir 86 is in the form of a bellows device of rubber or other suitable elastic material and has a resilient form of construction such as to tend to expand its volume without the aid of a spring. As ink is ejected from the print head 17B in operation, the volume of the reservoir 86 progressively decreases so as to reduce the rate at which the underpressure increases as ink is ejected. Of course, if reservoir 86 is made of rubber, the ink 40 must be of a type that does not react with rubber.

Figure 9:
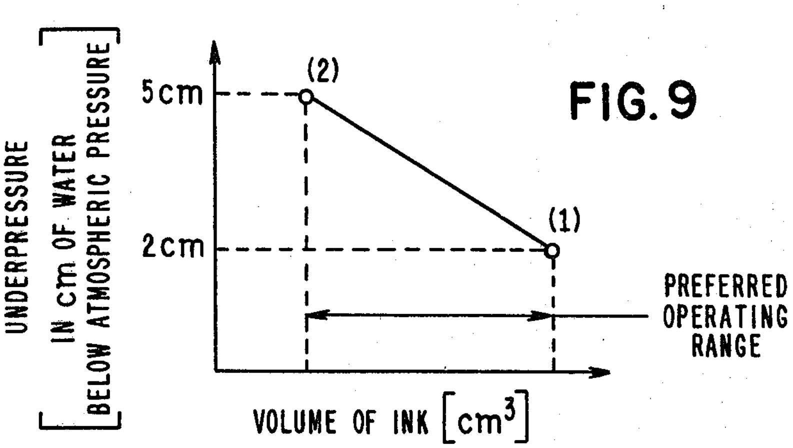
FIG. 9 is a diagram showing the underpressure in respect of the ink in the nozzles of an ink jet printer in accordance with the invention as a function of the volume of ink in the ink reservoir.

In respect of the various embodiments of the invention shown in FIGS. 1 to 8, the manner in which the underpressure varies in operation as a function of the change in the volume of ink in the ink reservoir (e.g., 42) is shown diagrammatically in FIG. 9. An ink reservoir containing its maximum permitted quantity of ink 40 generates the minimum required underpressure of 2 centimeters of water, as indicated at point (1). As ink is ejected through the nozzles of the print head, the amount of ink in the reservoir is reduced thereby causing the underpressure to rise, the rate of increase in the underpressure being kept down to a low rate by virtue of the fact that the air-tight container is permitted to reduce in volume as ink is ejected. As the ink reservoir empties, the underpressure increases until the maximum allowable underpressure of 5 centimeters of water is reached, as shown at point (2). At this point the ink reservoir is nearly empty and has to be replenished with ink or replaced by a new ink-filled reservoir. The requirement for replenishing or replacing the ink reservoir may be indicated to an operator by a visual or audible signal which may, for example, be triggered by sensing the height of the reservoir or the ink level therein by using either mechanical switching means or optical sensing means (not shown). The preferred operating range of the ink jet printer is indicated in FIG. 9 as between the just mentioned 2 and 5 centimeters of water (below atmospheric pressure).

The resilient means described in connection with each of the embodiments described above can be advantageously used for the cleaning of the nozzles of the associated print head. Thus, by applying pressure to the bellows device 46 or 86 of FIGS. 1 to 4 or FIG. 8, or to the piston member 73 of FIG. 6 or the flexible membrane 80 of FIG. 7, ink is forced out through the nozzles of the associated print head carrying therewith contaminating particles, dried ink residue and the like which may be blocking the nozzles.

Figure 10:
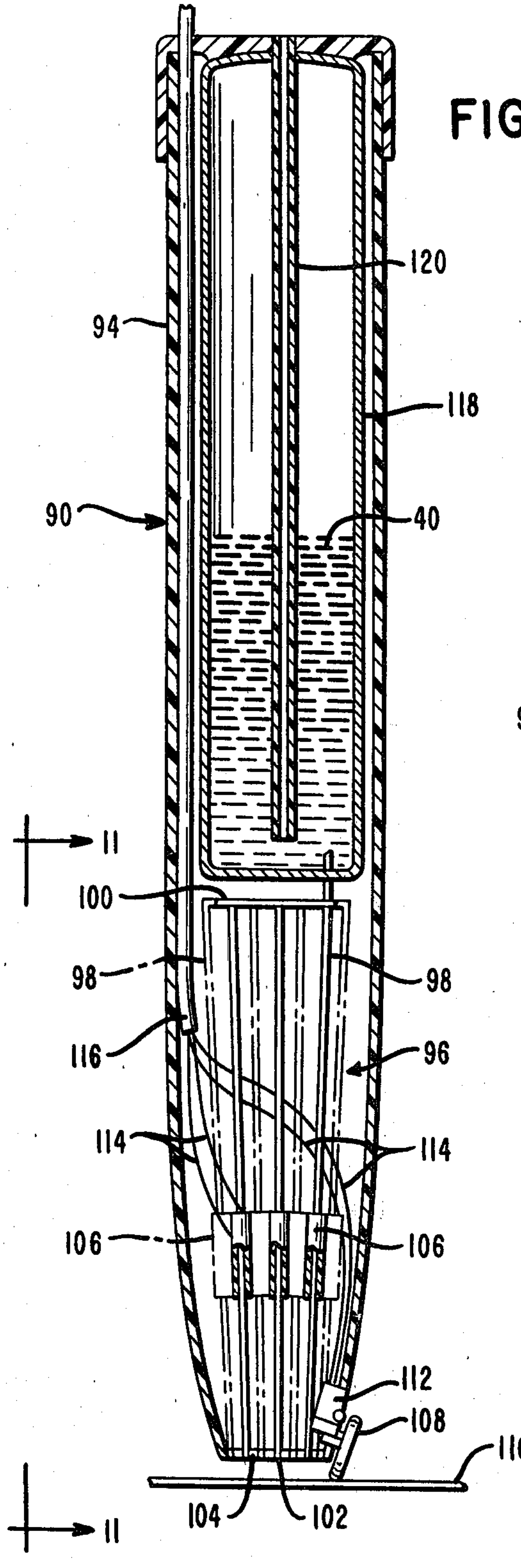
FIG. 10 is a schematic part-sectional representation of another embodiment of the invention in which pressure regulation is performed by capillary means.
Figure 11:
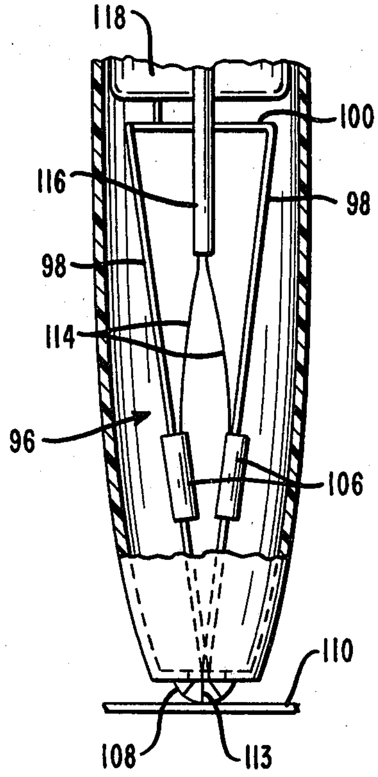
FIG. 11 is a partial side view of the lower part of the printer of FIG. 10, taken along line 11—11 of FIG. 10, with the housing partly broken away to expose details of the printer within the housing.
Figure 12:
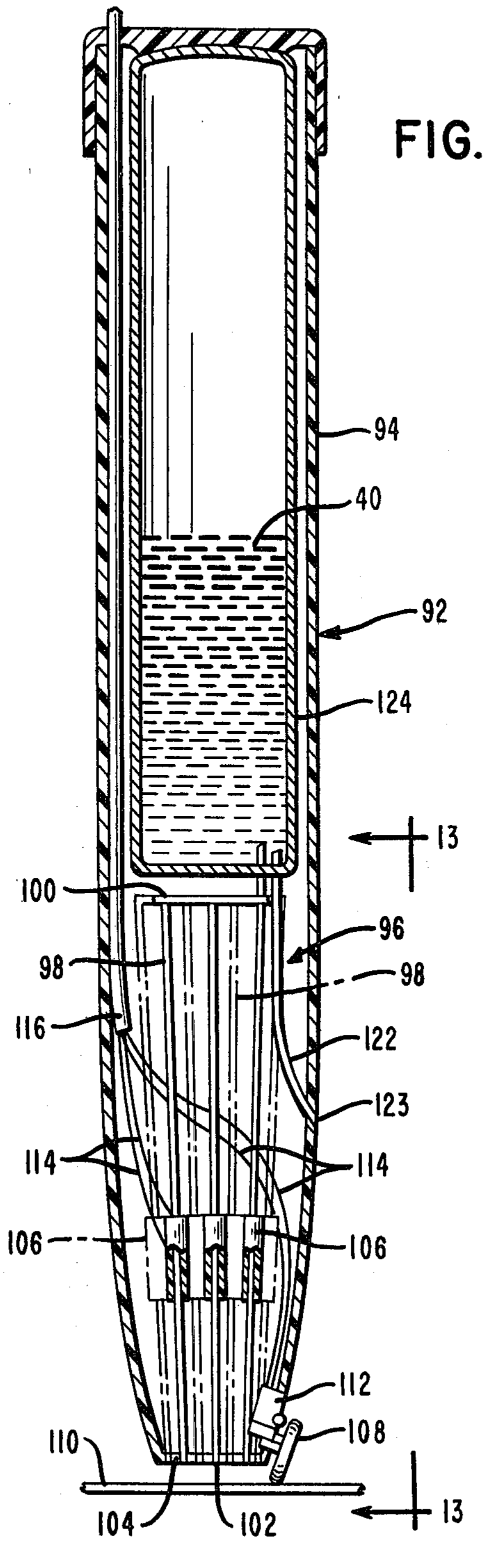
FIG. 12 is a schematic part-sectional representation of an ink jet printer similar to that of FIG. 10, in which the capillary means is differently disposed.
Figure 13:
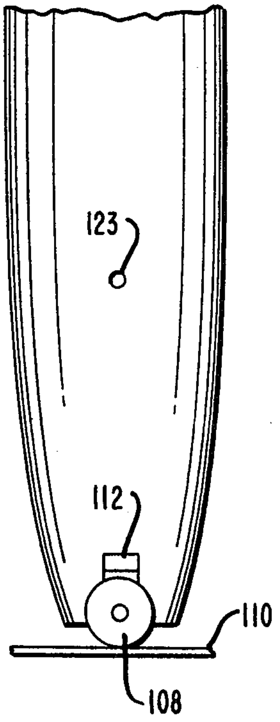
FIG. 13 is a partial side view of the printer of FIG. 12, as seen along line 13—13 of FIG. 12.

In FIGS. 10 and 11 there is shown a hand held ink jet printer 40, and in FIGS. 12 and 13, a hand held ink jet printer 92. The ink jet printers 90 and 92 illustrate alternate embodiments according to the invention in which the correct underpressure is maintained in the ink supply system by capillary means.

Each of the printers 90 and 92 includes a pen-shaped casing or housing 94 which is cylindrical with a tapered lower end in which is housed a print head 96. The print head 96 incorporates seven ink channels 98 each extending between an ink supply manifold 100 and the corresponding nozzle 102 formed in a nozzle plate 104, the nozzles 102 being arranged in a straight line. Each of the ink channels 98 includes a segment surrounded by a piezoelectric element 106. In order to enable the elements 106 to be accommodated in the casing 94, alternate ones of the ink channels 98 are disposed in two divergent planes, as illustrated best in FIG. 11.

As in the case of the printer 10 illustrated in FIGS. 1–4, the operative elements of the print head 96 (including the ink channels 98, the manifold 100, nozzle plate 104, and piezoelectric elements 106) can be embedded or potted in a suitably shaped block of plastic material to be fitted into the casing 94, although such block of plastic material has been omitted in the drawings for purposes of clarity.

The casing 94 of each printer 90 or 92 has rotatably mounted thereon adjacent its lower end a wheel 108 to permit rolling movement of the printer over a record medium 110 and to maintain the required spacing between the nozzle plate 104 and the record medium 110. The wheel 108 also serves as a timing wheel and is disposed in operative relationship with an optical sensing device 112 mounted in the casing 94 adjacent the wheel 108. The sensing device 112 is arranged to sense radially extending, equally spaced lines or markings 113 (FIG. 11) on the side of the wheel 108. Although not illustrated in detail, the device 112 is similar to device 58 in FIGS. 2 and 3, and includes an LED and phototransistor arranged in a conventional fashion to generate in operation a series of timing pulses which are utilized to control the operation of the piezoelectric elements 106 in a similar manner to that in which the pulses generated by the sensing device 58 control the operation of the piezoelectric elements 16 of the printer 10, as previously described. Electrical leads 114 for the piezoelectric elements 106 and the sensing device 112 are carried by an electrical cable 116 which extends along the interior of the casing 94. The cable 116 connects the piezoelectric elements and sensing device 112 to a remote computer or controller.

Referring to FIGS. 10 and 11, an ink reservoir 118 containing ink 40 is housed in the casing 94 above the print head 96 of the printer 90. A capillary passage or tube 120 is mounted in the ink reservoir 118, the tube 120 being open to the ambient atmosphere at its upper end and extending towards the bottom of the ink reservoir 118 so that in operation the lower end of the tube 120 is immersed in the ink 40 contained in the reservoir 118. It should be understood that the filled reservoir 118 is air-tight in operation, apart from the provision of the capillary tube 120.

Referring to FIGS. 12 and 13, a capillary passage or tube 122 is incorporated in the printer 92. In this case, the lower end 123 of the tube 122 is open to the ambient atmosphere, the tube 122 extending through the body of the print head 96 with the upper end of the tube 122 being disposed inside an ink reservoir 124 housed in the casing 94 above the print head 96. The upper end of the tube 122 is positioned adjacent the bottom of the reservoir 124 and is immersed in operation in ink 40 contained in the reservoir 124. It should be understood that the filled reservoir 124 is air-tight in operation, apart from the provision of the capillary tube 122.

In operation of the printer 90 (FIGS. 10 and 11) and the printer 92 (FIGS. 12 and 13), it is necessary to set initially the proper value of the underpressure at the nozzles 102 by draining or ejecting a small amount of ink from the reservoir 118 or 124. Once this value is set, the underpressure will be automatically maintained at this value by virtue of the provision of the capillary tube 120 or 122. When the underpressure tends to increase due to ink droplets being ejected through the print head nozzles 102, air bubbles enter through the capillary tube 120 or 122 into the air space of the reservoir 118 or 124 thereby preventing an actual increase in underpressure.

In each of the printers 90 and 92, the required underpressure in respect of the ink in the nozzles 102 relative to the ambient atmospheric pressure is the result of the combination of the capillary forces of the ink in the nozzles 102 and capillary tube 120 or 122, the hydrostatic pressure of the ink when the device is in its working position and the pneumatic underpressure in the air space in the ink reservoir 118 or 124. The capillary force or capillarity of the ink at the capillary tube 120 or 122 depends on the inner diameter of the tube, the surface tension of the ink and the adhesion between ink and tube.

It is, of course, important, that the opening of the tubes 120 or 122 within the reservoirs 118 or 124 be below the ink level, and thus immersed, since it is the capillarity of the ink and tubes that resists the intake of air through the tube and thus maintains the desired underpressure. It is additionally important that the inner diameter of the tubes 120 or 122 be sufficiently small for this same reason. The tubes 120 and 122 can be made of various suitable types of material, such as glass or nickel. For commonly available inks, a glass tube having an inner diameter of approximately 0.3 to 1.2 millimeters, or a nickel tube having an inner diameter of approximately 0.15 to 0.9 millimeters, would be suitable.

Figure 14:
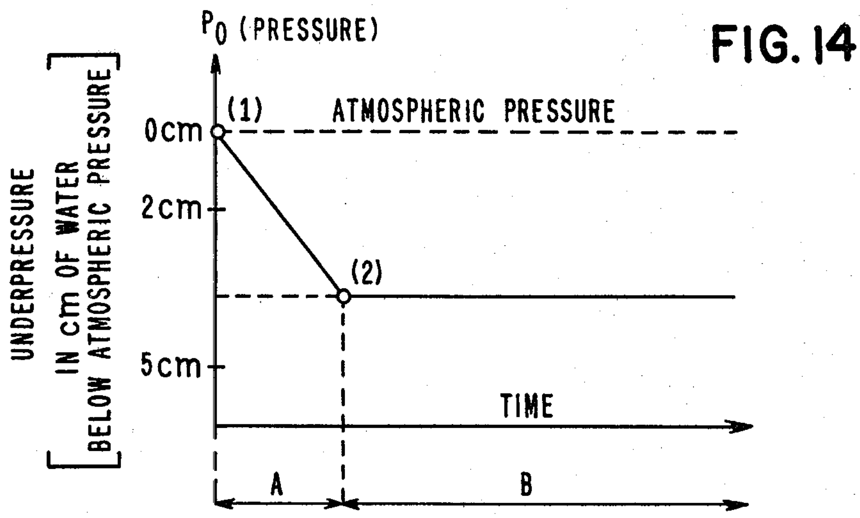
FIG. 14 is a diagram helpful in explaining the manner in which a steady underpressure is maintained in the embodiments of FIGS. 10 through 13.

FIG. 14 is a diagram showing the underpressure regulation in the ink supply system of each of the printers 90 and 92 shown in FIGS. 10 through 13 as a function of time. Before printing is commenced, and during a preliminary period A, the interior of the reservoir 118 or 124 may be at normal atmospheric pressure, as indicated at point (1). Ink is then removed through the nozzles 102 of the printer 90 or 92, such as by energization of the elements 106, thereby reducing the pressure in the ink reservoir 118 or 124 until the required underpressure, as determined by the capillary tube 120 or 122, is obtained. This is shown at point (2) of the diagram and, as noted earlier in conjunction with printer 10 of FIGS. 1-4, would normally be between 2 and 5 centimeters of water below atmospheric pressure, with the diameter of the nozzles 102 being approximately 0.07 millimeters. At this point, the preliminary period A terminates and the period B during which printing may be done commences. The ink jet print head 96 will normally operate with the underpressure at the level indicated at point (2) until the ink within the reservoir 118 or 124 is depleted.

In operation of the printer 90 or 92, the underpressure is maintained at the required level because air bubbles enter into the reservoir 118 or 124 through the capillary tube 120 or 122 as soon as the underpressure tends to increase as ink is ejected. Since the air bubbles entering into the reservoir 118 or 124 each have an almost negligible volume as compared with the volume of air in the reservoir, the underpressure may be considered as constant, and is represented by a straight line in the diagram.

It is thus seen that pressure regulation in an ink jet printer according to the invention is achieved by the provision of simple and cost effective means incorporated in the printer. This renders the invention particularly suitable for use in small and compact hand-held ink jet printers operating according to the drop-on-demand principle. The hand held printers of the present invention described above have higher operating speeds than the known hand held ink jet printers, such as described in U.S. Pat. No. 3,656,169, which has a single nozzle and which operates according to the electrostatic method discussed earlier.

Although the presently preferred embodiments of the present invention have been described, it should be understood that within the purview of the invention various changes may be made within the scope of the appended claims.

We claim:

1. A hand-held ink jet printer, comprising:
- a housing;
- at least one wheel rotatably mounted on said housing to support said housing for manual movement over a medium onto which characters are to be printed by the printer;
- a movement sensing device for sensing the rotation of said wheel;
- a print head within said housing and having a plurality of nozzles and a piezoelectric element associated with each of said nozzles for being selectively energizable to cause ejection of a droplet of ink from its associated nozzle, said piezoelectric element driven in response to the movement of said housing;
- a container having an ink reservoir and connected for supplying ink to be ejected through said nozzles, the ink in said ink reservoir maintained at a predetermined underpressure relative to atmospheric pressure outside said container so that the ejection of ink can be controlled by the energization of each said piezoelectric element; and
- a collapsible bellows device connected by a tube to said ink reservoir, said bellows device having resilient side walls so that, as ink is ejected through said nozzles, said bellows device collapses to reduce the interior volume of said container, with said resilient side walls biased against the collapsing of said bellows device in order to maintain the predetermined underpressure of the ink in said ink reservoir.

2. An ink jet printer including a print head having at least one piezoelectric driving element selectively energizable to cause ejection of a droplet of ink through a nozzle associated therewith, an ink reservoir for supplying ink to said print head, and capillary means connecting the interior of the ink reservoir with the ambient atmosphere with one end of said capillary means being so arranged as to be immersed in operation in ink contained in the reservoir, the reservoir being air-tight in operation apart from the provision of said capillary means whereby a predetermined underpressure is maintained in respect of the ink in said nozzle, any increase in underpressure as ink droplets are ejected being inhibited by virtue of the intake of air into the reservoir via said capillary means.

3. The ink jet printer of claim 2, wherein said capillary means comprises a tube having a sufficiently small inner diameter such that air from the atmosphere will pass from said tube and into the reservoir only when the predetermined underpressure is exceeded.

4. The ink jet printer of claim 3, wherein the diameter of said nozzle is approximately 0.07 millimeters, said tube is glass, and the inner diameter of said tube is in a range of approximately 0.3 to 1.2 millimeters.

5. The ink jet printer of claim 2, wherein the diameter of said nozzle is approximately 0.07 millimeters, said tube is nickel, and the inner diameter of said tube is in a range of approximately 0.15 to 0.9 millimeters.

6. An ink jet printer, comprising:
- a print head having at least one piezoelectric driving element selectively energizable to cause ejection of a droplet of ink through a nozzle associated therewith;
- an ink reservoir for supplying ink to said print head;
- said ink reservoir at least partially constituting a container which is air-tight in operation of the printer; and a bellows device for tending to increase the volume of said container so as to create an underpressure in respect of the ink in said nozzle and for permitting a decrease in the volume of said container as ink droplets are ejected so as to reduce the rate of any increase in the underpressure brought about by ink ejection;

said bellows device being linked to said ink reservoir by a tube so arranged that in operation ink from said ink reservoir is prevented from entering said bellows device.

7. The printer according to claim 6, wherein the inside surface of said tube is coated, at least in part, with a material which is not wetted by the ink in said ink reservoir.

8. The printer according to claim 7, wherein the ink in said ink reservoir is a water-based ink, and said coating material is silicon oil.

9. An ink jet printer, comprising:

a print head having at least one piezoelectric driving element selectively energizable to cause ejection of a droplet of ink through a nozzle associated therewith; and an ink reservoir for supplying ink to said print head;

said ink reservoir comprising an open-ended cylinder, a piston member slidably mounted for axial movement in said ink reservoir and providing an air-tight seal therefor, and resilient means being arranged within said ink reservoir for exerting pressure on said piston member, thereby tending to cause expansion of the volume of said ink reservoir so as to create an underpressure in respect of the ink in said nozzle.

10. An ink jet printer, comprising:

a print head having at least one piezoelectric driving element selectively energizable to cause ejection of a droplet of ink through a nozzle associated therewith;

an ink reservoir for supplying ink to said print head;

a flexible membrane providing an air-tight seal at one end of said ink reservoir; and resilient means being arranged within said ink reservoir to be compressed as ink droplets are ejected through said nozzle and for exerting pressure on said membrane to increase the volume of said ink reservoir so as to create an underpressure in respect of the ink in said nozzle, said membrane having a fold that provides slack so that said membrane does not tear as it follows the compression of said resilient means.

* * * * *